(12) United States Patent
Li

(10) Patent No.: US 10,914,591 B2
(45) Date of Patent: Feb. 9, 2021

(54) GUIDE CANE AND METHOD FOR GUIDING USED FOR GUIDE CANE

(71) Applicant: BOE TECHNOLOGY GROUP CO., LTD., Beijing (CN)

(72) Inventor: Yue Li, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 185 days.

(21) Appl. No.: 16/070,440

(22) PCT Filed: Dec. 15, 2017

(86) PCT No.: PCT/CN2017/116499
§ 371 (c)(1),
(2) Date: Jul. 16, 2018

(87) PCT Pub. No.: WO2018/227910
PCT Pub. Date: Dec. 20, 2018

(65) Prior Publication Data
US 2020/0041271 A1 Feb. 6, 2020

(30) Foreign Application Priority Data
Jun. 12, 2017 (CN) .......................... 2017 1 0454296

(51) Int. Cl.
*G01C 21/20* (2006.01)
*H04N 5/232* (2006.01)
(Continued)

(52) U.S. Cl.
CPC ......... *G01C 21/20* (2013.01); *G06K 7/10366* (2013.01); *G06K 9/00671* (2013.01); *G06K 19/0723* (2013.01); *H04N 5/23299* (2018.08)

(58) Field of Classification Search
CPC .... G01C 21/20; H04N 5/23299; H04N 5/247; G06K 7/10366; G06K 9/00671;
(Continued)

(56) References Cited

U.S. PATENT DOCUMENTS

| | | | | |
|---|---|---|---|---|
| 5,687,136 A | * | 11/1997 | Borenstein | G01S 15/88 367/116 |
| 8,418,705 B2 | * | 4/2013 | Ota | A61H 3/04 135/71 |
| 2008/0251110 A1 | | 10/2008 | Pede | |
| 2012/0112876 A1 | | 5/2012 | Kim | |

(Continued)

FOREIGN PATENT DOCUMENTS

| CN | 101073531 A | * | 11/2007 |
|---|---|---|---|
| CN | 101073531 A | | 11/2007 |

(Continued)

OTHER PUBLICATIONS

International Search Report from PCT Application No. PCT/CN2017/116499 dated Feb. 28, 2018 (4 pages).
(Continued)

*Primary Examiner* — Brian P Sweeney
(74) *Attorney, Agent, or Firm* — Dave Law Group LLC; Raj S. Dave

(57) ABSTRACT

Embodiments of the present disclosure provide a guide cane and a method for guiding used for a guide cane. The guide cane comprises a movement component and an object acquisition component. The object acquisition component is provided on the movement component, and the movement component is electrically coupled to the object acquisition component. The object acquisition component acquires a positional information of the target object in a target space, and determines a navigation route according to the target position indicated by the positional information and an initial position where the guide cane is currently located.
(Continued)

The movement component guides, according to the navigation route, a user to arrive at the target position.

18 Claims, 9 Drawing Sheets

(51) Int. Cl.
    *G06K 9/00* (2006.01)
    *G06K 7/10* (2006.01)
    *G06K 19/07* (2006.01)

(58) Field of Classification Search
    CPC .. G06K 19/0723; G06K 9/00; G06K 2209/01; G06K 7/10297; G06K 7/10386; A61H 3/06; A61H 3/061; A61H 3/068; A61H 2003/063; G01S 17/93; G01S 13/75; G01S 7/003
    USPC ........................................................ 701/409
    See application file for complete search history.

(56) References Cited

U.S. PATENT DOCUMENTS

| | | | | |
|---|---|---|---|---|
| 2012/0143495 | A1* | 6/2012 | Dantu | G01C 21/206 701/428 |
| 2014/0379251 | A1* | 12/2014 | Tolstedt | A61H 3/061 701/411 |
| 2018/0356233 | A1* | 12/2018 | Baqain | G01C 21/04 |
| 2019/0282433 | A1* | 9/2019 | Higgins | G06F 3/016 |

FOREIGN PATENT DOCUMENTS

| | | |
|---|---|---|
| CN | 102481206 A | 5/2012 |
| CN | 103126862 A | 6/2013 |
| CN | 103637900 A | 3/2014 |
| CN | 104940005 A | 9/2015 |
| CN | 105662797 A | 6/2016 |

OTHER PUBLICATIONS

Written Opinion from PCT Application No. PCT/CN2017/116499 dated Feb. 28, 2018 (3 pages).

* cited by examiner

GUIDE CANE AND METHOD FOR GUIDING USED FOR GUIDE CANE

CROSS REFERENCE TO RELATED APPLICATION

This application claims the benefit and priority of Chinese Patent Application No. 201710454296.8, filed on Jun. 12, 2017, the entire content of which is incorporated by reference herein.

FIELD OF THE DISCLOSURE

The present disclosure relates to the field of smart devices, and in particular, to a guide cane and a method for guiding used for a guide cane.

BACKGROUND

Blind people are a special living group. Due to their limited vision, it is inconvenience to watch for them, so that there are many difficulties in life. The guide cane has been developed, to better help the blind (or visually impaired users). The guide cane attracts extensive attention for its advantages such as convenience and intelligence.

BRIEF DESCRIPTION

Embodiments of the present disclosure provide a guide cane and a method for guiding used for a guide cane.

A first aspect of the present disclosure provides a guide cane. The guide cane comprises: a movement component and an object acquisition component. The object acquisition component is provided on the movement component, and the movement component is electrically coupled to the object acquisition component. The object acquisition component is configured to acquire a positional information of a target object in a target space, and determine a navigation route according to a target position indicated by the positional information and an initial position where the guide cane is currently located. The movement component is configured to guide a user to arrive at the target position according to the navigation route.

In an embodiment of the present disclosure, the object acquisition component is further configured to guide the user, in response to the user arriving at the target position, to acquire the target object under driving of the movement component.

In an embodiment of the present disclosure, the guide cane further comprises a communication module, which is provided on the movement component and is electrically coupled to the object acquisition component. The communication module is configured to send object acquisition request information to a server in response to an operation instruction, which is configured to instruct acquiring the target object, the object acquisition request information comprising an identifier of the target object. The communication module is further configured to receive the positional information of the target object sent by the server, and send the positional information to the object acquisition component.

In an embodiment of the present disclosure, the guide cane further comprises an information collection module and a conversion module, the information collection module and the conversion module being respectively coupled to the communication module. The information collection module is configured to acquire an object keyword, and send the object keyword to the server through the communication module. The information collection module is further configured to receive a recommendation information sent by the server through the communication module, the recommendation information comprising an identifier of the object indicated by the object keyword. The communication module is further configured to send the recommendation information to the conversion module. The conversion module is configured to convert the recommendation information into a first voice signal, which is configured to prompt the user to select the target object through the information collection module.

In an embodiment of the present disclosure, the object acquisition component comprises a navigation module and an object positioning module. The movement component comprises a movement chassis, and the object positioning module is provided on a top of the movement chassis. The navigation module is configured to determine the initial position, determine the navigation route according to the target position and the initial position, and send the navigation route to the movement chassis. The object positioning module is configured to determine the target object from the objects within the target space and guide the user to acquire the target object under driving of the movement chassis.

In an embodiment of the present disclosure, the navigation module comprises a radio frequency identification (RFID) reader, a lidar and a first processing module, the RFID reader and the lidar being respectively coupled to the first processing module, the target space being provided with m RFID passive tags, the m RFID passive tags being located at different positions, m being an integer greater than 1. The RFID reader and the m RFID passive tags are configured to estimate first coordinates of the guide cane on a two-dimensional grid map of the target space. The lidar is configured to transmit a detection signal to an obstacle in a surrounding environment, and acquires radar data of the lidar according to a returned detection signal, where the radar data comprises distance and direction of the obstacle with respect to the lidar. The first processing module is configured to determine, on the basis of the first coordinates and the radar data, second coordinates of the guide cane on the two-dimensional grid map by using a particle filter algorithm, and to determine the initial position according to the second coordinates. The first processing module is further configured to determine the navigation route according to the target position and the initial position, and send the navigation route to the movement chassis.

In an embodiment of the present disclosure, the RFID reader is configured to filter out, from the m RFID passive tags according to a detected signal strength value of the RFID passive tag during movement of the guide cane, the top n RFID passive tags ranked by the signal strength value, where n is an integer, and n<m. The RFID reader is further configured to send, through the communication module, identifier of each of the n RFID passive tags to the server, and receive, through the communication module, tag coordinates of the corresponding RFID passive tags sent by the server, the tag coordinates being the coordinates of the RFID passive tag on the two-dimensional grid map of the target space. The RFID reader is further configured to estimate, on the basis of the tag coordinates of each of the n RFID passive tags and the distance on the two-dimensional grid map between the RFID passive tag and the guide cane, the first coordinates of the guide cane on the two-dimensional grid map by using the maximum likelihood estimation method.

In an embodiment of the present disclosure, the target space is a library, the target object is a target book, and the positional information comprises information concerning the position of the target book on a bookshelf, and the identifier of the target book comprises the classification number of the target book. The object positioning module comprises a longitudinal retractable mechanism, a smart camera and a lateral retractable mechanism, the smart camera being coupled to the conversion module. The longitudinal retractable mechanism is configured to drive the smart camera, according to the positional information, to move longitudinally to the position of the target book on the bookshelf. The smart camera is configured to move laterally under the driving of the movement chassis, identify classification numbers of the books on the bookshelf, and in response to an identified classification number being identical with the classification number of the target book, instruct the lateral retractable mechanism to extend to the target book. The smart camera is further configured to instruct the conversion module to generate a second voice signal, which is configured to prompt the user to acquire the target book.

In an embodiment of the present disclosure, the information collection module is further coupled to the object positioning module. The information collection module is further configured to, in response to a confirmation instruction, instruct the object positioning module to restore to the initial state.

In an embodiment of the present disclosure, the guide cane further comprises a armrest, the armrest being provided with a vibrator and an emergency stop button, the vibrator being coupled to the navigation module, the emergency stop button being coupled to the movement chassis. The navigation module is further configured to, in response to detecting an obstacle in front of the guide cane, instruct the vibrator to vibrate so as to drive the armrest to vibrate. In response to the emergency stop button being pressed, the movement chassis can be controlled to move or stop.

In an embodiment of the present disclosure, the movement chassis comprises a movement platform, wheels, a driver and a controller, the controller being electrically coupled to the object acquisition component. The wheels are provided at the bottom of the movement platform, the controller is configured to control the driver according to the navigation route, and the driver is configured to drive the wheels to move.

A second aspect of the present disclosure provides a method for guiding used for a guide cane. The method comprises acquiring a positional information of a target object in a target space; determining a navigation route according to a target position indicated by the positional information and an initial position where the guide cane is currently located; and guiding, according to the navigation route, a user to arrive at the target position.

In an embodiment of the present disclosure, the method further comprises in response to the user arriving at the target position, guiding the user to acquire the target object.

In an embodiment of the present disclosure, acquiring the positional information of the target object comprises: in response to an operation instruction, sending object acquisition request information to a server, the operation instruction being configured to instruct to acquire the target object, the object acquisition request information comprising the identifier of the target object; receiving the positional information of the target object sent by the server.

In an embodiment of the present disclosure, before sending the object acquisition request information to the server in response to the operation instruction, the method further comprises acquiring an object keyword inputted by the user; sending the object keyword to the server; receiving a recommendation information sent by the server, the recommendation information comprising the identifier of the object indicated by the object keyword; converting the recommendation information into a first voice signal, which is configured to prompt the user to select the target object.

In an embodiment of the present disclosure, before guiding the user to acquire the target object, the method further comprises determining the target object among the objects within the target space.

In an embodiment of the present disclosure, determining the navigation route according to the target position indicated by the positional information and the initial position where the guide cane is currently located, comprises estimating first coordinates of the guide cane on the two-dimensional grid map of the target space; transmitting a detection signal to an obstacle in a surrounding environment, acquiring radar data of lidar according to a returned detection signal, the radar data comprising distance and direction of the obstacle with respect to the lidar; determining, on the basis of the first coordinates and the radar data, second coordinates of the guide cane on the two-dimensional grid map by using a particle filter algorithm; determining the initial position according to the second coordinates; determining the navigation route according to the target position and the initial position.

In an embodiment of the present disclosure, the target space is provided with m RFID passive tags, the m RFID passive tags are located at different positions, and m is an integer greater than 1. Estimating the first coordinates of the guide cane on the two-dimensional grid map of the target space comprises filtering out, from the m RFID passive tags according to the detected signal strength value of the RFID passive tag during movement of the guide cane, the top n RFID passive tags ranked by the signal strength value, n being an integer, and n<m; sending the identifier of each of the n RFID passive tags to the server; receiving the tag coordinates of a corresponding RFID passive tag sent by the server, the tag coordinates being the coordinates of the RFID passive tag on the two-dimensional grid map of the target space; estimating the first coordinates of the guide cane on the two-dimensional grid map by using a maximum likelihood estimation method, on the basis of the tag coordinates of each of the n RFID passive tags and the distance on the two-dimensional grid map between each RFID passive tag and the guide cane.

In an embodiment of the present disclosure, the target space is a library, the target object is a target book, the positional information comprises information concerning the position of the target book on a bookshelf, and the identifier of the target book comprises the classification number of the target book. Determining the target object among the objects within the target space comprises: identifying the classification number of the books on the bookshelf; determining, in response to an identified classification number being identical with the classification number of the target book, that the corresponding book is the target book. After determining that the corresponding book is the target book, the method further comprises: generating a second voice signal, the second voice signal being configured to prompt the user to acquire the target book.

A third aspect of the present disclosure provides a guide cane, comprising: a processor; and a memory configured to store computer program instructions, the memory being coupled to the processor. The computer program instructions, when executed by the processor, cause the guide cane to: acquire a positional information of a target object in a target space; determine a navigation route according to the target position indicated by the positional information and the initial position where the guide cane is currently located; and guide, according to the navigation route, a user to arrive at the target position.

A fourth aspect of the present disclosure provides a storage medium, instructions in which, when executed by a processor of a guide cane, enables the guide cane to perform the method for guiding used for a guide cane provided in the second aspect.

BRIEF DESCRIPTION OF THE DRAWINGS

In order to illustrate the technical solution of the present disclosure more clearly, the drawings of the embodiments will be briefly described below. Apparently, the drawings described below are merely concerning some of the embodiments of the present disclosure. Those of ordinary skill in the art may also acquire other drawings according to these drawings without creative efforts.

FIG. 2-1 is a schematic structural diagram of a guide cane provided by an embodiment of the present disclosure;

FIG. 2-2 is a schematic structural diagram of another guide cane provided by an embodiment of the present disclosure;

FIG. 3-1 is a flowchart of a method for guiding used for a guide cane provided by an embodiment of the present disclosure;

FIG. 3-2 is a flowchart of another method for guiding used for a guide cane provided by an embodiment of the present disclosure;

FIG. 3-3 is a flowchart for acquiring a positional information of a target object in the embodiment shown in FIG. 3-2;

FIG. 3-4 is a flowchart for determining a navigation route in the embodiment shown in FIG. 3-2;

FIG. 3-5 is a flowchart for estimating first coordinates of the guide cane in the embodiment shown in FIG. 3-2;

FIG. 3-6 is a flowchart of determining a target object in the embodiment shown in FIG. 3-2.

DETAILED DESCRIPTION

In order to make the objectives, technical solutions and advantages of the embodiments of the present disclosure clearer, the technical solutions of the embodiments of the present disclosure will be clearly and completely described below with reference to the accompanying drawings. Apparently, the described embodiments are only a part rather than all of the embodiments of the present disclosure. All other embodiments obtained by those of ordinary skill in the art according to the described embodiments without creative efforts shall also fall within the scope of the present disclosure.

Hereinafter, unless otherwise specified, the expression "element A coupled to element B" means that element A is "directly" coupled to element B or "indirectly" coupled to element B through one or more other elements.

As used herein, the singular forms "a/an," "this/that," and "the" are intended to comprise the plural forms as well, unless expressly stated otherwise.

As used herein, the terms "comprising" and "including" refer to the presence of the described feature, integer, step, operation, element and/or section, but does not exclude the presence or addition of one or more other features, integers, steps, operations, elements, components, and/or combinations thereof.

Usually, a guide cane comprises a detection module and a positioning module. The detection module is configured to detect obstacles on the road surface in real time and transmit the detection results to the blind person to help them avoid obstacles. The positioning module is configured to determine a route from the start to the destination and to guide the blind person follow the route to arrive at the destination, such as a library, a supermarket, etc.

Figure 1:
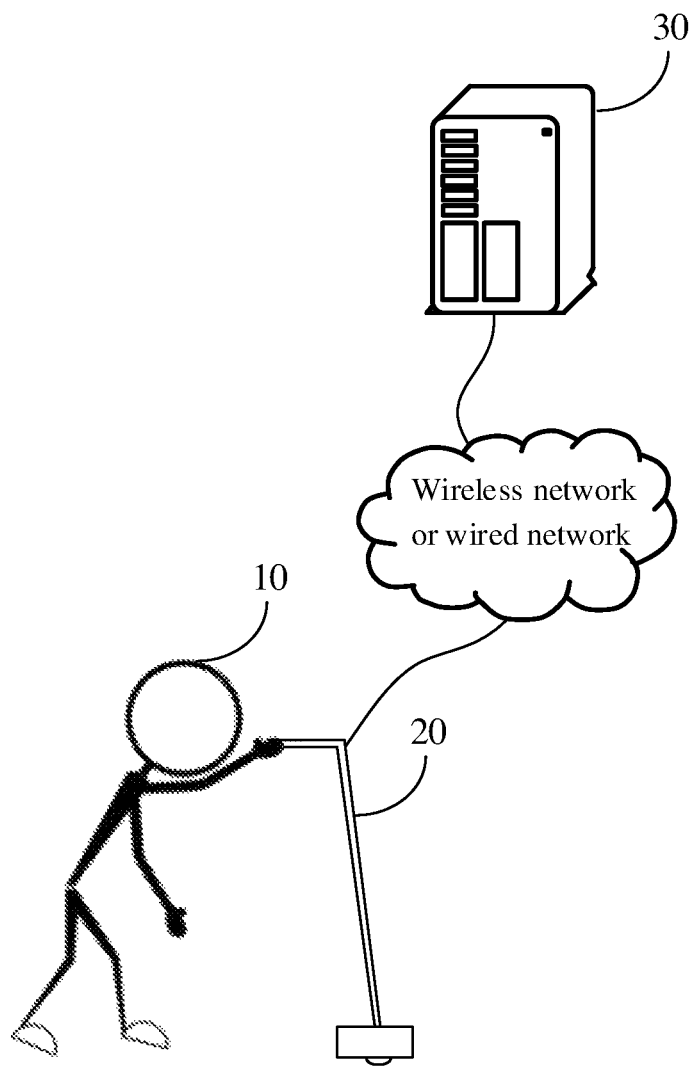
FIG. 1 is a schematic diagram of an implementation environment involved in some embodiments of the present disclosure.

FIG. 1 is a schematic diagram of an implementation environment involved in various embodiments of the present disclosure. The implementation environment may comprise a user 10, a guide cane 20, and a server 30. The user 10 may be a blind person or a visually impaired user. The server 30 may be a server, or a server cluster composed of several servers, or a cloud computing service center. The server 30 can be connected with the guide cane 20 through a wireless network or a wired network. The server 30 can send the positional information of a target object to the guide cane 20.

In an embodiment of the present disclosure, after the user has arrived at the destination, the guide cane can guide the user to arrive at the target position indicated by the positional information of the target object, and help the user to get the target object. For example, after the user has arrived at the library, the guide cane can guide the user to arrive at the target position indicated by the positional information of the target book, so that the user can get the target book faster.

Figures 1, 2:
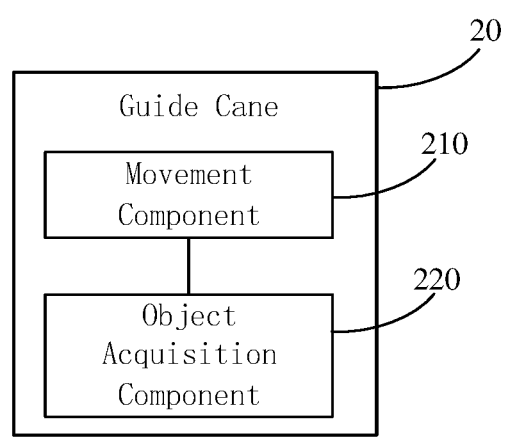
Figure 2:
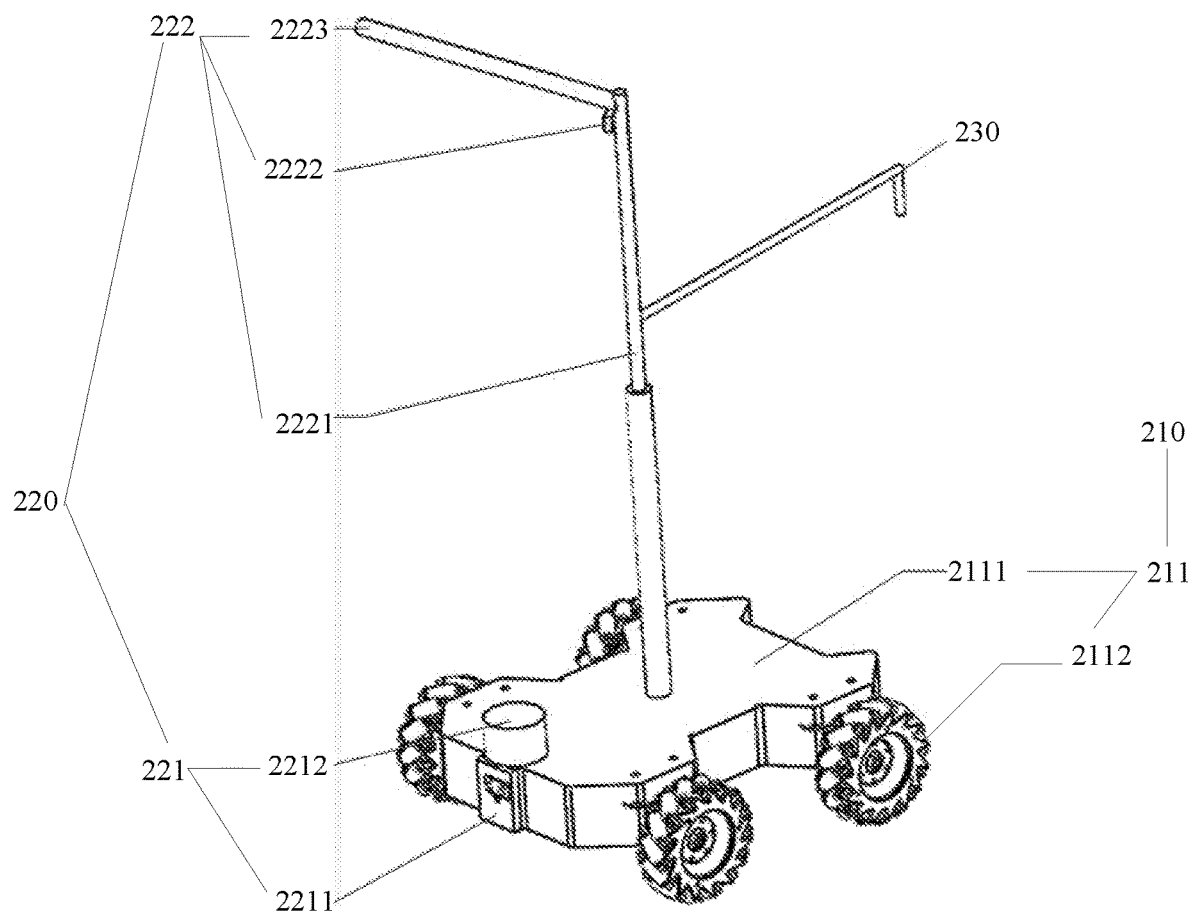

FIG. 2-1 is a schematic structural diagram of a guide cane according to an embodiment of the present disclosure. The guide cane 20 comprises a movement component 210 and an object capture component 220. The object acquisition component 220 is provided on the movement component 210. The movement component 210 is electrically coupled to the object acquisition component 220. The object acquisition component 220 may acquire the positional information of the target object in the target space after the user has arrived at the target space, and determine a navigation route according to the target position indicated by the positional information and an initial position where the guide cane is currently located. The movement component 210 may guide the user to arrive at the target position according to the navigation route.

Therefore, the guide cane can help the user to plan a route more conveniently and has more functions, according to the embodiment of the present disclosure.

In an embodiment, the object acquisition component 220 can also guide the user, when the user arrives at the target position, to acquire the target object under driving of the movement component 210. Specifically, the guide cane not only can guide the user to arrive at the target position indicated by the positional information of the target object, but can further guide the user to acquire the target object, so that the guide cane has more functions. For example, the guide cane can guide the user to arrive at the position of the bookshelf where the target book is placed, and can also guide the user to acquire the target book on the bookshelf.

In addition, the guide cane may also comprise a communication module. The communication module is provided on the movement component and is electrically coupled to the object acquisition component. Upon acquisition of an operation instruction triggered by the user, the communication module may send object acquisition request information to the server. The operation instruction instructs to acquire the target object, and the object acquisition request information comprises an identifier of the target object. For example, the identifier of the target object may be the name of the target object. The communication module can also receive the positional information of the target object sent by the server and send the positional information to the object acquisition component. The communication module may be a Wireless-Fidelity (Wi-Fi) communication module.

In an embodiment, the guide cane may also comprise an information collection module and a conversion module. The information collection module and the conversion module are respectively coupled to the communication module. The information collection module can acquire an object keyword inputted by the user and send the object keyword to the server through the communication module. The information collection module may also receive recommendation information sent by the server through the communication module. The recommendation information comprises the identifier of the object indicated by the object keyword. For example, the identifier of the object may be the name of the object. The communication module can also send the recommendation information to the conversion module. The conversion module can convert the recommendation information into a first voice signal. The first voice signal may prompt the user to select the target object through the information collection module.

The description will be given by taking the target space as a library as an example. The information collection module in the embodiment of the present disclosure may be a braille keyboard, and the conversion module may be an earphone worn by a user. When the user arrives at the library, the user enters a keyword "history" for a desired book through the braille keyboard. The braille keyboard sends the keyword "history" to the server through the communication module. The server recommends related books to the user according to the keyword "history", for example, the recommendation information may be sent to the braille keyboard, and the recommendation information comprises the names of the books indicated by the keyword "history". For example, the server recommends 3 books to the user: book A, book B, and book C. A, B, and C are book names. The communication module sends the recommendation information containing the book names to the earphone worn by the user. The earphone acquires an electrical signal and then converts the electrical signal into a first voice signal. The user acquires 3 book names through the first voice signal, and then selects one of the books through the braille keyboard. For example, a voice prompt from an earphone can be: "Related books recommended to you are: book A, book B, and book C; press 1 to select book A, press 2 to select book B, and press 3 to select book C." Thereafter, the user selects the book A of interest according to the voice prompt, and the book A is the target book. Upon acquisition of an operation instruction triggered by the user, the communication module sends the name of the book A to the server. After receiving the name of the book A sent by the communication module, the server sends the positional information of the book A to the communication module. The communication module sends the received positional information of the book A to the object acquisition component, so that the object acquisition component determines a navigation route according to the target position indicated by the positional information of the book A (i.e., the position of the bookshelf where the book A is placed) and the initial position where the guide cane is currently located. The movement component can instruct the user to arrive at the target position according to the navigation route. For example, the target position is the bookshelf 0001 of room 201 in area F, that is, the book A is located on the bookshelf numbered 0001 in the room 201 of the area F. The positional information of the book A sent by the server to the communication module may also comprise the layer number information of the book A on the bookshelf 0001, for example, the book A is placed on the third layer of the bookshelf 0001.

For example, the earphone worn by the user may be a Bluetooth earphone. The guide cane may also comprise a Bluetooth module. The guide cane communicates with the Bluetooth earphone through the Bluetooth module.

FIG. 2-2 is a schematic structural diagram of another guide cane provided by an embodiment of the present disclosure. As shown in FIG. 2-2, the object acquisition component 220 comprises a navigation module 221 and an object positioning module 222. The movement component 210 comprises a movement chassis 211. The object positioning module 222 is provided on the top of the movement chassis 211.

The navigation module 221 can determine the initial position where the guide cane is currently located, determine a navigation route according to the target position indicated by the positional information of the target object and the initial position, and send the navigation route to the movement chassis 211.

The object positioning module 222 can determine the target object from the objects within the target space and guide the user to acquire the target object under the driving of the movement chassis 211. For example, the object positioning module determines the book A from all the books on the third layer of the bookshelf 0001 in the room 201 in the area F, and guides the user to acquire the book A under the driving of the movement chassis 211.

In an embodiment of the present disclosure, in order to determine the initial position where the guide cane is currently located, the navigation module can first coarsely locate the guide cane, and then use a particle filter algorithm to finely locate the guide cane. For example, as shown in FIG. 2-2, the navigation module 221 comprises a radio frequency identification (RFID) reader 2211, a lidar 2212, and a first processing module (not shown in FIG. 2-2). Specifically, the RFID reader 2211 and the lidar 2212 are respectively coupled to the first processing module. The first processing module comprises a processor. The target space is provided with m RFID passive tags (not shown in FIG. 2-2), wherein the m RFID passive tags are located at different positions, and m is an integer greater than 1.

The RFID reader 2211 and the m RFID passive tags can estimate the first coordinates of the guide cane on the two-dimensional grid map of the target space. For example, the library can be divided into a series of grids, each grid given a value that indicates the probability that the corresponding grid is occupied. Related technologies can be referenced with respective to the construction process of a two-dimensional grid map.

Specifically, during the movement of the guide cane, the RFID reader can filter out, from the m RFID passive tags according to a detected signal strength value of the RFID passive tag, the top n RFID passive tags ranked by the signal strength value, where n is an integer, and n<m. The RFID reader can also send, through the communication module, the identifier of each of the n RFID passive tags to the server, and receive, through the communication module, tag coordinates of the corresponding RFID passive tag sent by the server. The tag coordinates are the coordinates of the RFID passive tag on the two-dimensional grid map of the target space. The RFID reader can also estimate, on the basis of the tag coordinates of each of the n RFID passive tags and the distance on the two-dimensional grid map between each RFID passive tag and the guide cane, the first coordinates of the guide cane on the two-dimensional grid map by using the maximum likelihood estimation method. The maximum likelihood estimation method estimates the position coordinates of an unknown node by acquiring the distances from a plurality of known nodes to the unknown node, to find out the result of the real coordinates closest to the unknown nodes among all estimation results.

In an example, RFID passive tags are provided on the sides of each bookshelf in the library. During the movement of the guide cane, the RFID reader filters out, from a plurality of RFID passive tags, the top n RFID passive tags ranked by the signal strength values. The RFID reader then sends the identifier of each of the n RFID passive tags (such as the serial number of each RFID passive tag) to the server through the communication module. The server sends the tag coordinates of the n RFID passive tags to the RFID reader. For example, the tag coordinates of the first RFID passive tag are $(x_1, y_1)$, the tag coordinates of the second RFID passive tag are $(x_2, y_2)$, the tag coordinates of the third RFID passive tag are $(x_3, y_3)$, . . . , and the tag coordinates of the $n^{th}$ RFID passive tag are $(x_n, y_n)$. In addition, the distance between the first RFID passive tag and the guide cane on the two-dimensional grid map is $d_1$, the distance between the second RFID passive tag and the guide cane on the two-dimensional grid map is $d_2$, the distance between the third RFID passive tag and the guide cane on the two-dimensional grid map is d3, . . . , the distance between the $n^{th}$ RFID passive tag and the guide cane on the two-dimensional grid map is $d_n$. The distance between the RFID passive tag and the guide cane can be determined by the RFID reader.

The first coordinates of the guide cane to be acquired on the two-dimensional grid map are set to be (x, y). The RFID reader acquires the following equation set based on the tag coordinates of the n RFID passive tags, the n distances, and the first coordinates (x, y):

$$\begin{cases} (x_1 - x)^2 + (y_1 - y)^2 = d_1^2 \\ (x_2 - x)^2 + (y_2 - y)^2 = d_2^2 \\ (x_3 - x)^2 + (y_3 - y)^2 = d_3^2 \\ \ldots \\ (x_n - x)^2 + (y_n - y)^2 = d_n^2 \end{cases} \quad (1)$$

The RFID reader then converts the equation set (1) to a linear equation set AX=B. Then, the linear equation set AX=B can be solved using the least square method, to acquire the value of X. The value of X is the first coordinates (x, y) of the guide cane to be acquired on the two-dimensional grid map. The first coordinates (x, y) are also referred to as the coarse positioning coordinates of the guide cane. Herein, the related technologies can be referenced in relation to the specific process of solving AX=B, which will not be described here.

The lidar 2212 can transmit a detection signal (a laser beam) to an obstacle in a surrounding environment, and acquire radar data of the lidar according to the returned detection signal. The radar data comprises the distance and direction of the obstacle with respect to the lidar, i.e., the distance and direction of the obstacle with respect to the guide cane. Herein, the surrounding environment can be a two-dimensional planar environment. The radar data can reflect the fine positioning coordinates of the guide cane. The related technologies can be referenced in relation to the specific process for acquiring radar data.

The first processing module may use a particle filter algorithm to determine the second coordinates of the guide cane on the two-dimensional grid map based on the coarsely-positioned first coordinates and the finely-positioned radar data, and determine the initial position according to the second coordinates.

Determining the initial position of the guide cane using a particle filter algorithm may comprise the following steps. First, the distributed particle of the first coordinates can be determined. For example, a plurality of particles (e.g., 100 particles) near the first coordinates of the guide cane may be determined, each particle indicating one pair of coordinates. Exemplarily, a plurality of particles satisfying a Gaussian distribution near the first coordinates may be determined. Specifically, more particles are determined at a position near the first coordinates, and fewer particles are determined at a position further from the first coordinates. Then, according to the radar data acquired by the lidar, the weight of each particle can be determined. Further, the weights can be normalized. The weight indicates how close the coordinates indicated by the corresponding particle are to the actual coordinates of the guide cane. Next, the particles can be resampled to increase the number of particles with larger weights, achieving the survival of the fittest with respect to the particles. Finally, the position of the coordinates indicated by the particle with the highest weight can be taken as the initial position where the guide cane is currently located. The related technologies can be referenced in relation to the specific process of the particle filter algorithm.

The first processing module may also determine a navigation route according to the target position and the initial position and send the navigation route to the movement chassis 211. For example, the first processing module may determine, according to the target position and the initial position, the navigation route using a global path planning method based on Dijkstra's algorithm and a local path planning method based on a dynamic window algorithm, combined with the two-dimensional grid map and the radar data obtained by the lidar.

In the case that the target space is a library and the target object is a target book, the positional information of the target book comprises positional information of the target book on the bookshelf, for example, the third layer of the bookshelf 0001 in the room 201 in the area F, and the identifier of the target book may comprise the classification number of the target book, such as D669.3, C393, etc.

As shown in FIG. 2-2, the object positioning module 222 may comprise a longitudinal retractable mechanism 2221, a smart camera 2222, and a lateral retractable mechanism 2223. The smart camera 2222 is coupled to the conversion module.

According to an embodiment of the present disclosure, the longitudinal retractable mechanism 2221 can drive the smart camera 2222, according to the positional information of the target book, to move longitudinally to the position of the target book on the bookshelf. For example, the longitudinal retractable mechanism 2221 can drive the smart camera 2222 to move longitudinally to the third layer of the book A in the bookshelf 0001. The smart camera 2222 can be moved laterally under the driving of the movement chassis 211 to identify the classification number of the books on the bookshelf where the target book is located. When an identified classification number is the same as the classification number of the target book, the smart camera 2222 instruct the lateral retractable mechanism 2223 to extend to the target book. The smart camera 2222 may also instruct the conversion module to generate a second voice signal. The second voice signal may prompt the user to take the target book.

In an example, the target book is book A, while the positional information of the book A is the third layer, bookshelf 0001, room 201, area F. The movement component guides the user, according to the navigation route, to arrive at the position where the bookshelf 0001 in the room 201 in the area F is located. Thereafter, the longitudinal retractable mechanism drives the smart camera to move longitudinally to the third layer of the bookshelf 0001. The smart camera moves laterally under the driving of the movement chassis and identifies the classification number of the books on the third layer. The identification process may comprise the following steps. First, the smart camera collects an image of the classification number of the books, and performs graying and binarization process on the classification number image. Specifically, the gray value of pixel points on the image is set to 0 or 255 so that the entire image exhibits a clear black and white effect. Then, the processed classification number image is subjected to denoising processing, and the classification number of the denoised classification number image is segmented to acquire a plurality of characters. In addition, the feature of each of the plurality of characters is extracted to generate a feature vector (or a feature matrix) of the corresponding character. Thereafter, the smart camera compares the feature vector of each character with the feature vectors of characters in a sample library, wherein the sample library comprises the classification number of the target book such as the feature vector of each character in C393.

For example, the classification number of the first book comprises four characters. The similarity between the feature vector of the first character of the four characters and the feature vector of the character "C" in C393 is a1, the similarity between the feature vector of the second character and the feature vector of the character "3" in C393 is a2, the similarity between the feature vector of the third character and the feature vector of the character "9" in C393 is a3, and the similarity between the feature vector of the fourth character and the feature vector of the character "3" in C393 is a4. When a1, a2, a3, and a4 are all equal to 1, the classification number of the first book is considered to be the same as the classification number of the target book. In this case, the first book is considered as the target book, that is, the first book is the book A. In practical applications, in the case where the smart camera cannot completely correctly acquire a plurality of characters during segmentation, the sum of a1, a2, a3, and a4 can be configured as the target similarity between the classification number of the first book and the classification number of the target book C393. Then, the largest target similarity among all target similarities greater than the preset similarity can be found out. For example, if the target similarity between the classification number of the first book and C393 is greater than the preset similarity and the target similarity is the largest, the first book may be considered as the target book. Afterwards, the smart camera instructs the lateral retractable mechanism to extend to the target book.

After the smart camera instructing the lateral retractable mechanism to extend to the target book, the smart camera instructs the earphone worn by the user to give a voice prompt. For example, "Please take the book A along the lateral retractable mechanism." As a result, the user can acquire the book A under the guidance of the lateral retractable mechanism. After acquiring the book A, the user can also input the next destination to be reached through the braille keyboard, for example, a reading room, a service desk, and the like. The guide cane determines the corresponding navigation route through the object acquisition component and guides the user to arrive at the next destination through the movement component. Further, after the user arrived at the reading room, the user can read the book A using a portable scanner reader.

In an embodiment, the information collection module may also be coupled to the object positioning module 222.

The information collection module may also instruct the object positioning module 222 to return to the initial state, upon reception of a confirmation instruction. For example, after acquiring the book A through the guidance of the lateral retractable mechanism, the user may confirm through the braille keyboard. Thereafter, the information collection module instructs the longitudinal retractable mechanism, the smart camera and the lateral retractable mechanism of the object positioning module to return to the initial position.

In addition, when the target similarity between the classification number of all books on the third layer and the classification number C393 of the target book is smaller than the preset similarity, the smart camera may instruct the earphone worn by the user to issue a voice prompt: the book A has not been found, please confirm to acquire another book. The user selects another recommended book, such as book B, through the braille keyboard based on the voice prompt. The guide cane then guides the user to acquire the book B in the above manner.

In an embodiment, as shown in FIG. 2-2, the guide cane 20 may further comprise a armrest 230. The user can hold the armrest 230, so as to facilitate the user to arrive at the target position and get the target object.

The armrest 230 is provided with a vibrator and an emergency stop button (not shown in FIG. 2-2). The vibrator is coupled to the navigation module 221, and the emergency stop button is coupled to the movement chassis 211. The navigation module can also instruct the vibrator, upon detection of an obstacle in front of the guide cane, to generate vibration, so as to drive the armrest to vibrate. The emergency stop button can control the movement chassis to move or stop. When there is an obstacle in front of the guide cane, the armrest vibrates, and when the user presses the emergency stop button down, the movement chassis stops. When the user presses the emergency stop button again, the movement chassis resumes movement.

In addition, the navigation module may also instruct the movement component to perform deceleration or acceleration.

Specifically, as shown in FIG. 2-2, the movement chassis 211 comprises a movement platform 2111, wheels 2112, a driver (not shown in FIG. 2-2) and a controller (not shown in FIG. 2-2). The controller is electrically coupled to the object acquisition component 220. The wheels 2112 are provided at the bottom of the movement platform 2111. The controller may control the driver according to the navigation route. The driver may drive the wheels 2112 to move.

In addition, the guide cane further comprises a power module. The power module is coupled to various components of the guide cane. The power module can supply power to the guide cane.

In summary, according to an embodiment of the present disclosure, the object acquisition component of the guide cane acquires the positional information of the target object after the user has arrived at the target space, and determines a navigation route according to the target position indicated by the positional information and the initial position where the guide cane is currently located. The movement component can follow the navigation route to guide the user to arrive at the target position. The object acquisition component can guide the user, when the user has arrived at the target position, to acquire the target object under the driving of the movement component, which enriches the function of the guide cane.

Figures 1, 3:
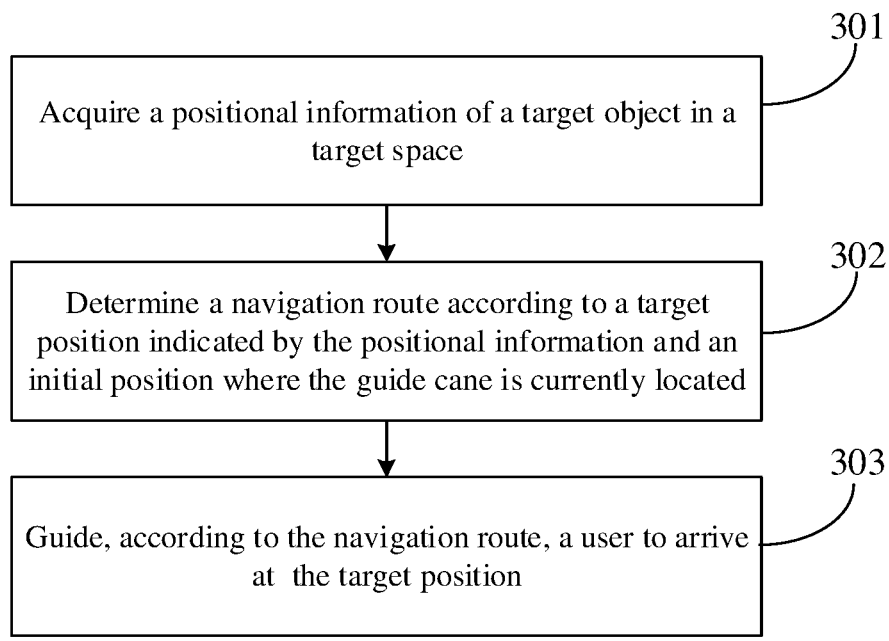
Figures 2, 3:
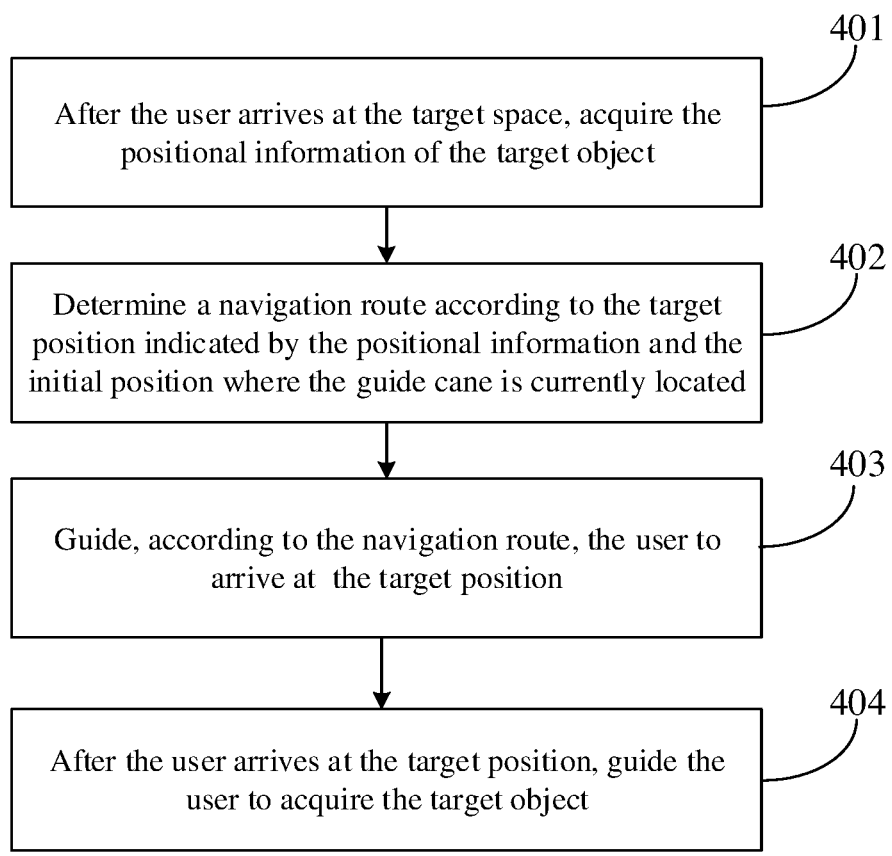
Figure 3:
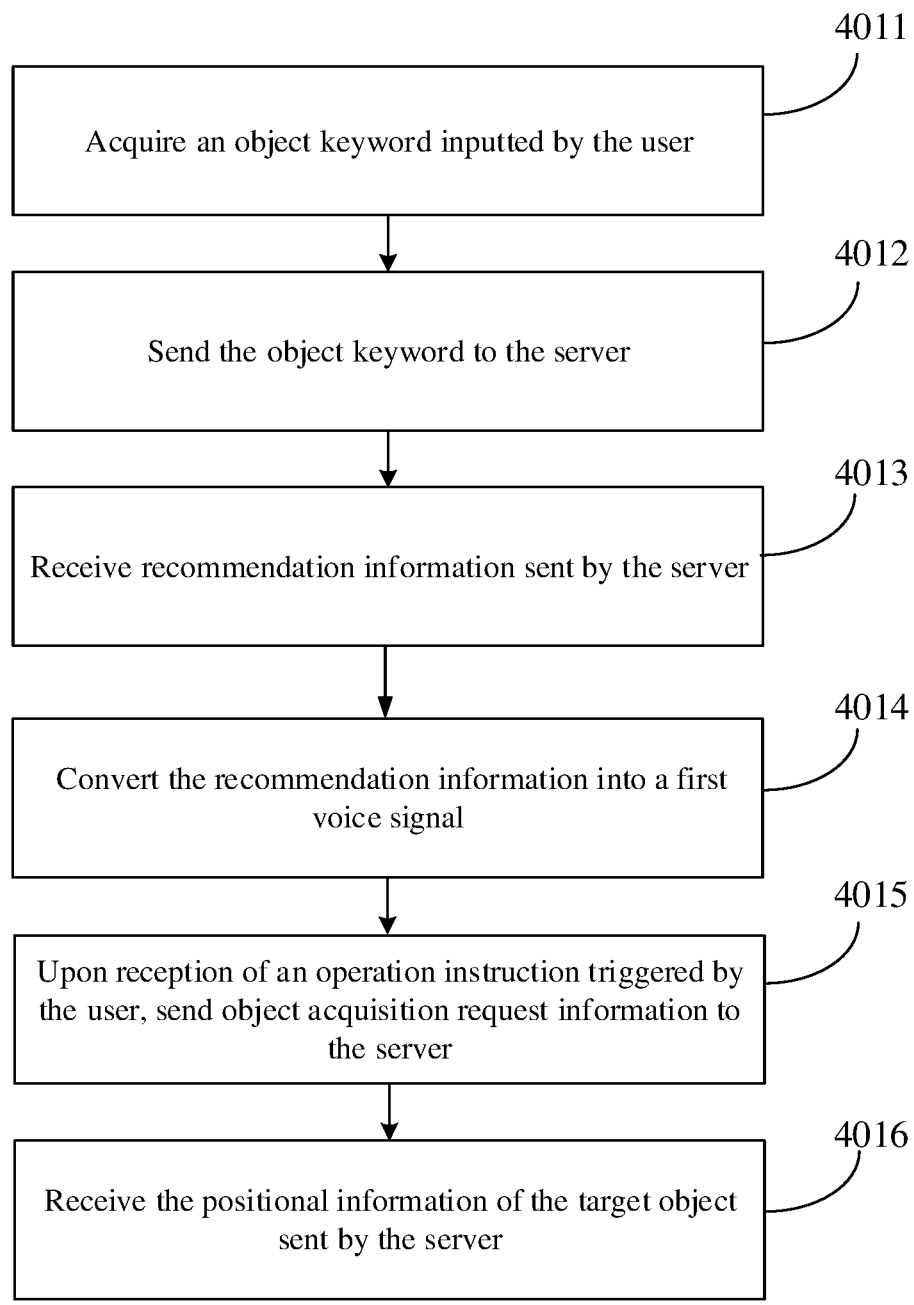

The embodiments of the present disclosure provide a method for guiding used for a guide cane. The guide cane may be the guide cane shown in FIG. 2-1 or FIG. 2-2. As shown in FIG. 3-1, the method may comprise the following steps.

At Step 301, after the user has arrived at the target space, the positional information of the target object can be acquired. Referring to FIG. 2-1, the guide cane comprises a movement component 210 and an object acquisition component 220. After the user has arrived at the target space, the object acquisition component 220 may acquire the positional information of the target object.

At Step 302, a navigation route can be determined according to the target position indicated by the positional information and the initial position where the guide cane is currently located. Referring to FIG. 2-1, the object acquisition component 220 may determine a navigation route according to the target position indicated by the positional information and the initial position where the guide cane is currently located.

At Step 303, the user can be guided to arrive at the target position according to the navigation route. Referring to FIG. 2-1, the movement component 210 can guide the user to arrive at the target position according to the navigation route.

In summary, according to the guiding method provided in the embodiments of the present disclosure, the positional information of the target object can be acquired after the user has arrived at the target space, a navigation route can be determined according to the target position indicated by the positional information and the initial position where the guide cane is currently located. Then, the user can be guided to arrive at the target position by following the navigation route. This enriches the function of the guide cane.

The embodiments of the present disclosure provide another method for guiding used for a guide cane. The guide cane may be the guide cane shown in FIG. 2-1 or FIG. 2-2, and as shown in FIG. 3-2, the method may comprise the following steps.

At Step 401, after the user has arrived at the target space, the positional information of the target object can be acquired. Specifically, as shown in FIG. 3-3, acquiring the positional information of the target object comprises the following steps. At Step 4011, an object keyword inputted by the user can be acquired. The guide cane comprises a communication module, an information collection module, and a conversion module. The information collection module acquires the object keyword inputted by the user. At Step 4012, the object keyword can be to the server. The information collection module sends the object keyword to the server through the communication module. At Step 4013, recommendation information sent by the server can be received. The recommendation information comprises the identifier of the object indicated by the object keyword. For example, the identifier of the object may be the name of the object. The information collection module receives the recommendation information sent by the server through the communication module. At Step 4014, the recommendation information can be converted into a first voice signal. The first voice signal is configured to prompt the selection of the target object. The communication module sends the recommendation information to the conversion module. At Step 4015, upon acquisition of an operation instruction triggered by the user, object acquisition request information can be sent to the server. Upon acquisition of an operation instruction, the communication module sends object acquisition request information to the server. The operation instruction is configured to instruct to acquire the target object. The object acquisition request information comprises the identifier of the target object. At Step 4016, the positional information of the target object sent by the server can be received. The communication module receives the positional information of the target object sent by the server.

Figures 3, 4:
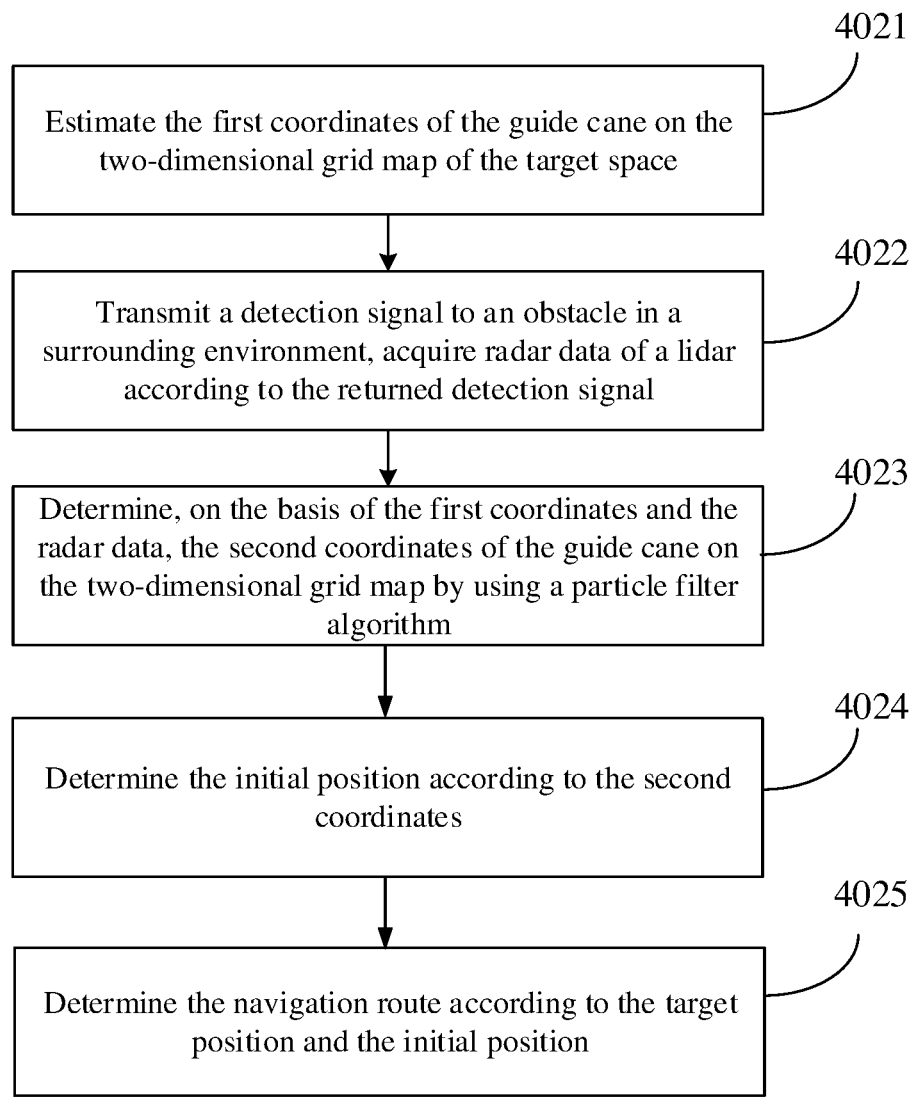

At Step 402, a navigation route can be determined according to the target position indicated by the positional information and the initial position where the guide cane is currently located. Referring to FIG. 2-2, the object acquisition component 220 comprises a navigation module 221 and an object positioning module 222. The movement component 210 comprises a movement chassis 211. The navigation module 221 comprises an RFID reader 2211, a lidar 2212, and a first processing module. The target space can be provided with m RFID passive tags, wherein the m RFID passive tags are located at different positions, and m is an integer greater than 1. Specifically, as shown in FIG. 3-4, step 402 comprises the following steps. At Step 4021, the first coordinates of the guide cane can be estimated on the two-dimensional grid map of the target space. Alternatively, the RFID reader and the m RFID passive tags can estimate the first coordinates of the guide cane on the two-dimensional grid map of the target space.

Figures 3, 4, 5:
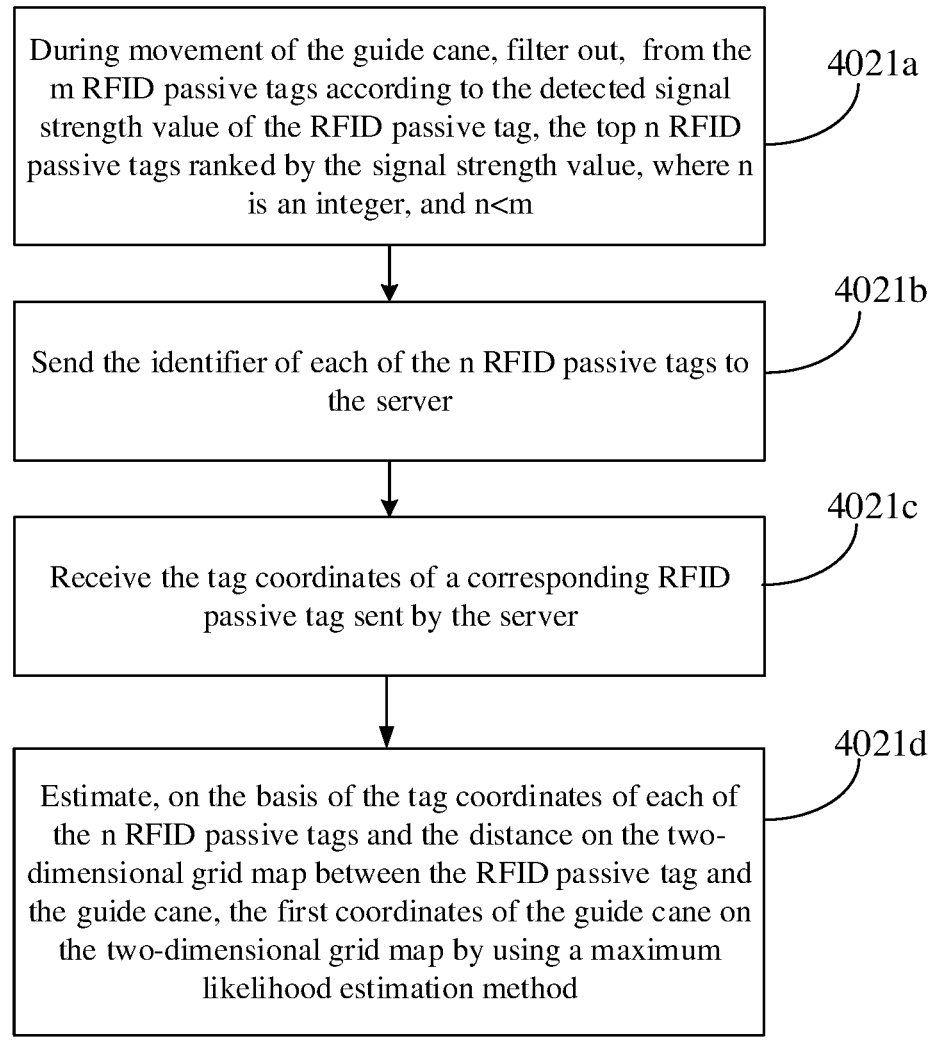
Figures 3, 4, 5, 6:
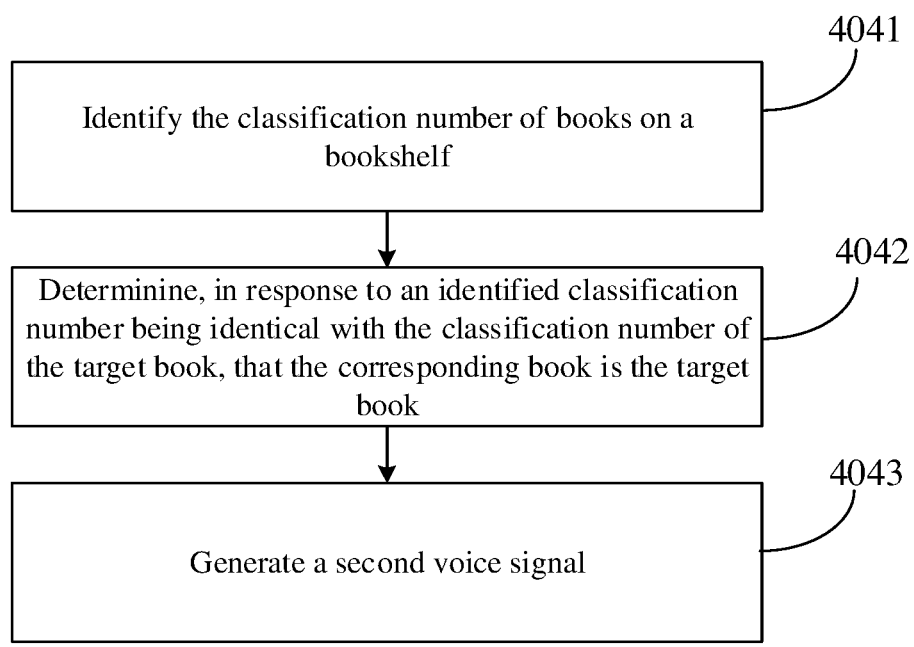

Specifically, as shown in FIG. 3-5, the step 4021 comprises the following steps. At step 4021a, during movement of the guide cane, the top n RFID passive tags ranked by the signal strength values can be filtered out from the m RFID passive tags according to the detected signal strength value of the RFID passive tag, wherein n is an integer, and n<m. During movement of the guide cane, the RFID reader filters out, from the m RFID passive tags according to the detected signal strength value of the RFID passive tag, the top n RFID passive tags ranked by the signal strength value. At Step 4021b, the identifier of each of the n RFID passive tags can be sent to the server. The RFID reader sends the identifier of each of the n RFID passive tags to the server through the communication module. At Step 4021c, the tag coordinates of the corresponding RFID passive tag sent by the server can be received. The tag coordinates are the coordinates of the RFID passive tag on the two-dimensional grid map of the target space. The RFID reader receives the tag coordinates of the corresponding RFID passive tag sent by the server through the communication module. At Step 4021d, the first coordinates of the guide cane can be estimated on the two-dimensional grid map by using a maximum likelihood estimation method, on the basis of the tag coordinates of each of the n RFID passive tags and the distance on the two-dimensional grid map between each RFID passive tag and the guide cane. The RFID reader estimates the first coordinates of the guide cane on the two-dimensional grid map by using a maximum likelihood estimation method, on the basis of the tag coordinates of each of the n RFID passive tags and the distance on the two-dimensional grid map between each RFID passive tag and the guide cane.

At Step 4022, a detection signal can be transmitted to an obstacle in a surrounding environment, and radar data of the lidar can be acquired according to the returned detection signal. The radar data comprises the distance and direction of the obstacle with respect to the lidar. Herein, the surrounding environment is a two-dimensional planar environment. Referring to FIG. 2-2, the lidar 2212 transmits a detection signal to an obstacle in the surrounding environment, and acquires radar data of the lidar according to the detection signal returned by the obstacle.

At Step 4023, on the basis of the first coordinates and the radar data, the second coordinates of the guide cane can be determined on the two-dimensional grid map by using a particle filter algorithm. The first processing module determines, based on the coarsely-positioned first coordinates and the finely-positioned radar data, the second coordinates of the guide cane on the two-dimensional grid map by using a particle filter algorithm.

At Step 4024, the initial position can be determined according to the second coordinates. The first processing module determines the initial position according to the second coordinates.

At Step 4025, a navigation route can be determined according to the target position and the initial position. The first processing module determines the navigation route based on the target position and the initial position, and sends the navigation route to the movement chassis.

Then, at step 403, the user can be guided to arrive at the target position according to the navigation route. Referring to FIG. 2-2, the movement component 210 guides the user to arrive at the target position according to the navigation route.

At Step 404, the user can be guided to acquire the target object when the user arrives at the target position. Further, before guiding the user to acquire the target object, the method further comprises determining the target object from the objects within the target space. Referring to FIG. 2-2, the object positioning module 222 comprises a longitudinal retractable mechanism 2221, a smart camera 2222, and a lateral retractable mechanism 2223.

Alternatively, the target space is a library. The target object is a target book. The positional information comprises information on the position of the target book on the bookshelf. The identifier of the target book comprises the classification number of the target book.

As shown in FIG. 3-6, determining the target object from the objects within the target space comprises the following steps. At Step 4041, the classification number of books on the bookshelf can be identified. The smart camera identifies the classification number of books on the bookshelf. For the identification process, reference may be made to the related content in the above device embodiments. At Step 4042, when an identified classification number is the same as the classification number of the target book, the corresponding book can be determined as the target book. When an identified classification number is the same as the classification number of the target book, the smart camera determines the corresponding book as the target book. At Step 4043, a second voice signal can be transmitted. The second voice signal is used to prompt the user to take the target book. The smart camera may instruct the conversion module to transmit the second voice signal.

In summary, according to the method for guiding used for a guide cane provided by the embodiment of the present disclosure, it can acquire the positional information of the target object after the user has arrived at the target space, determine a navigation route according to the target position indicated by the positional information and the initial position where the guide cane is currently located, thereafter, guide the user, according to the navigation route, to arrive at the target position, and when the user has arrived at the target position, guide the user to acquire the target object. Therefore, it enriches the function of the guide cane.

It should be noted that the sequence of the steps of the guiding method provided in the embodiments of the present disclosure may be adjusted appropriately, and the steps may also be added or reduced according to the situation. Any method that can be easily conceived by a person skilled in the art within the technical scope disclosed by the present disclosure shall fall within the protection scope of the present disclosure and will not be described in detail.

A person skilled in the art can clearly understand that, for convenience and brevity of description, specific processes in the above-described method embodiments may refer to the specific working processes of the modules in the foregoing device embodiments, which are not described herein again.

The embodiments of the present disclosure also provide a guide cane. The guide cane comprise a processor and a memory configured to store executable instructions of the processor. The processor is configured to acquire the positional information of the target object after the user has arrived at the target space, determine a navigation route according to the target position indicated by the positional information and the initial position where the guide cane is currently located, and guide the user to arrive at the target position according to the navigation route.

The embodiments of the present disclosure further provide a guide system comprising a guide cane. The guide cane is the guide cane shown in FIG. 2-1 or FIG. 2-2.

The embodiments of the present disclosure further provide a storage medium, the instructions in which, when executed by a processor of a guide cane, enables the guide cane to perform the method for guiding used for a guide cane shown in FIG. 3-1 or FIG. 3-2.

It will be appreciated by those of ordinary skill in the art that all or part of the steps of implementing the embodiments described as above may be accomplished by a hardware or may be accomplished by a relevant hardware instructed by a program that is stored in a computer-readable storage medium. The storage medium mentioned as above may be a read-only memory, a magnetic disk, an optical disk, or the like.

The foregoing has described several embodiments of the present invention in detail, but the scope of protection of the present disclosure is not limited thereto. It will be apparent to those of ordinary skill in the art that various modifications, substitutions or variations can be made in the embodiments of the present invention without departing from the spirit and scope of the invention. The scope of protection of the present disclosure is defined by the appended claims.

What is claimed is:

1. A guide cane, wherein the guide cane comprises: a movement component and an object acquisition component,
   wherein the object acquisition component is located on the movement component, and the movement component is electrically coupled to the object acquisition component;
   the object acquisition component is configured to acquire a positional information of a target object in a target space, and determine a navigation route according to a target position indicated by the positional information and an initial position where the guide cane is currently located, wherein the target space is a library;
   the movement component is configured to guide by its movement a user to arrive at the target position according to the navigation route;
   wherein the object acquisition component is further configured to guide the user, in response to the user arriving at the target position, to acquire the target object under driving of the movement component, the target object is a target book, and the positional information comprises information concerning the position of the target book on a bookshelf.

2. The guide cane according to claim 1, wherein the guide cane further comprises a communication module, which is provided on the movement component and is electrically coupled to the object acquisition component,
wherein the communication module is configured to send an object acquisition request information to a server in response to an operation instruction, which is configured to instruct acquiring the target object, the object acquisition request information comprising an identifier of the target object;
wherein the communication module is further configured to receive the positional information of the target object sent by the server, and send the positional information to the object acquisition component.

3. The guide cane according to claim 2, wherein the guide cane further comprises an information collection module and a conversion module, the information collection module and the conversion module being respectively coupled to the communication module,
wherein the information collection module is configured to acquire an object keyword, and send the object keyword to the server through the communication module;
the information collection module is further configured to receive a recommendation information sent by the server through the communication module, the recommendation information comprising an identifier of the object indicated by the object keyword;
the communication module is further configured to send the recommendation information to the conversion module;
the conversion module is configured to convert the recommendation information into a first voice signal, which is configured to prompt the user to select the target object through the information collection module.

4. The guide cane according to claim 2, wherein the object acquisition component comprises a navigation module and an object positioning module, wherein the movement component comprises a movement chassis, and the object positioning module is provided on a top of the movement chassis,
wherein the navigation module is configured to determine the initial position, determine the navigation route according to the target position and the initial position, and send the navigation route to the movement chassis;
the object positioning module is configured to determine the target object from the objects within the target space and guide the user to acquire the target object under driving of the movement chassis.

5. The guide cane according to claim 4, wherein the navigation module comprises a RFID reader, a lidar and a first processing module, the RFID reader and the lidar being respectively coupled to the first processing module, the target space being provided with m RFID passive tags, the m RFID passive tags being located at different positions, m being an integer greater than 1,
wherein the RFID reader and the m RFID passive tags are configured to estimate first coordinates of the guide cane on a two-dimensional grid map of the target space;
the lidar is configured to transmit a detection signal to an obstacle in a surrounding environment, and acquires radar data of the lidar according to a returned detection signal, where the radar data comprises distance and direction of the obstacle with respect to the lidar;
the first processing module is configured to determine, on the basis of the first coordinates and the radar data, second coordinates of the guide cane on the two-dimensional grid map by using a particle filter algorithm, and to determine the initial position according to the second coordinates;
the first processing module is further configured to determine the navigation route according to the target position and the initial position, and send the navigation route to the movement chassis.

6. The guide cane according to claim 5, wherein the RFID reader is configured to filter out, from the m RFID passive tags according to a detected signal strength value of the RFID passive tag during movement of the guide cane, the top n RFID passive tags ranked by the signal strength value, where n is an integer, and
n<m;
the RFID reader 1 s further configured to send, through the communication module, identifier of each of then RFID passive tags to the server, and receive, through the communication module, tag coordinates of the corresponding RFID passive tags sent by the server, the tag coordinates being the coordinates of the RFID passive tag on the two-dimensional grid map of the target space;
the RFID reader is further configured to estimate, on the basis of the tag coordinates of each of the n RFID passive tags and the distance on the two-dimensional grid map between the RFID passive tag and the guide cane, the first coordinates of the guide cane on the two-dimensional grid map by using the maximum likelihood estimation method.

7. The guide cane according to claim 4, wherein the identifier of the target book comprises the classification number of the target book,
wherein the object positioning module comprises a longitudinal retractable mechanism, a smart camera and a lateral retractable mechanism, the smart camera being coupled to the conversion module;
the longitudinal retractable mechanism is configured to drive the smart camera, according to the positional information, to move longitudinally to the position of the target book on the bookshelf;
the smart camera is configured to move laterally under the driving of the movement chassis, identify classification numbers of the books on the bookshelf, and in response to an identified classification number being identical with the classification number of the target book, instruct the lateral retractable mechanism to extend to the target book;
the smart camera is further configured to instruct the conversion module to generate a second voice signal, which is configured to prompt the user to acquire the target book.

8. The guide cane according to claim 7,
wherein the information collection module is further coupled to the object positioning module;
the information collection module is further configured to, in response to a confirmation instruction, instruct the object positioning module to restore to the initial state.

9. The guide cane according to claim 4, wherein the guide cane further comprises a armrest, the armrest being provided with a vibrator and an emergency stop button, the vibrator being coupled to the navigation module, and the emergency stop button being coupled to the movement chassis, wherein the navigation module is further configured to, in response to detecting an obstacle
in front of the guide cane, instruct the vibrator to vibrate so as to drive the armrest to vibrate;
in response to the emergency stop button being pressed, the movement chassis can be controlled to move or stop.

10. The guide cane according to claim 4, wherein the movement chassis comprises a movement platform, wheels, a driver and a controller, the controller being electrically coupled to the object acquisition component,
wherein the wheels are provided at the bottom of the movement platform, the controller is configured to control the driver according to the navigation route, and the driver is configured to drive the wheels to move.

11. A method for guiding implemented by a guide cane, the method comprising:
acquiring, by an object acquisition component, a positional information of a target object in a target space;
determining, by the object acquisition component, a navigation route according to a target position indicated by the positional information and an initial position where the guide cane is currently located;
guiding, by a movement component, according to the navigation route, a user by movement of the guide cane to arrive at the target position; and
in response to the user arriving at the target position, guiding, by the object acqusition component, the user to acquire the target object.

12. The method according to claim 11, wherein acquiring the positional information of the target object comprises:
in response to an operation instruction, sending an object acquisition request information to a server, wherein the operation instruction is configured to instruct to acquire the target object, and the object acquisition request information comprises an identifier of the target object;
receiving the positional information of the target object sent by the server.

13. The method according to claim 12, wherein before sending the object acquisition request information to the server in response to the operation instruction, the method further comprises:
acquiring an object keyword;
sending the object keyword to the server;
receiving a recommendation information sent by the server, the recommendation
information comprising the identifier of the object indicated by the object keyword;
converting the recommendation information into a first voice signal, which is configured to prompt the user to select the target object.

14. The method according to claim 11, wherein before guiding the user to acquire the target object, the method further comprises:
determining the target object among the objects within the target space.

15. The method according to claim 14, wherein, the target space is a library, the target object is a target book, the positional information comprises information concerning the position of the target book on a bookshelf, and the identifier of the target book comprises the classification number of the target book,
wherein determining the target object among the objects within the target space comprises: identifying the classification number of the books on the bookshelf;
determining, in response to an identified classification number being identical with the classification number of the target book, that the corresponding book is the target book;
wherein after determining that the corresponding book is the target book, the method further comprises:
generating a second voice signal, the second voice signal being configured to prompt the user to acquire the target book.

16. The method according to claim 11, wherein determining the navigation route according
to the target position indicated by the positional information and the initial position where the guide cane is currently located, comprises:
estimating first coordinates of the guide cane on the two-dimensional grid map of the target space;
transmitting a detection signal to an obstacle in a surrounding environment, acquiring radar data of lidar according to a returned detection signal, the radar data comprising distance and direction of the obstacle with respect to the lidar;
determining, on the basis of the first coordinates and the radar data, second coordinates of the guide cane on the two-dimensional grid map by using a particle filter algorithm;
determining the initial position according to the second coordinates;
determining the navigation route according to the target position and the initial position.

17. The method according to claim 16, wherein the target space is provided with m RFID passive tags, the m RFID passive tags are located at different positions, and m is an integer greater than 1,
wherein estimating the first coordinates of the guide cane on the two-dimensional grid map of the target space comprises:
filtering out, from the m RFID passive tags according to a detected signal strength value of the RFID passive tag during movement of the guide cane, the top n RFID passive tags ranked by the signal strength value, where n is an integer, and n<m;
sending the identifier of each of the n RFID passive tags to the server;
receiving the tag coordinates of a corresponding RFID passive tag sent by the server, the tag coordinates being the coordinates of the RFID passive tag on the two-dimensional grid map of the target space;
estimating the first coordinates of the guide cane on the two-dimensional grid map by using a maximum likelihood estimation method, on the basis of the tag coordinates of each of the n RFID passive tags and the distance on the two-dimensional grid map between each RFID passive tag and the guide cane.

18. A guide cane, comprising:
a processor;
a memory coupled to the processor and storing computer program instructions,
wherein, the computer program instructions, when executed by the processor, cause the guide cane to:
acquire by an object acquisition component, a positional information of a target object in a target space;
determine, by the object acquisition component, a navigation route according to the target position indicated by the positional information and the initial position where the guide cane is currently located;
guide, by a movement component, according to the navigation route, a user to arrive at the target position; and in response to the user arriving at the target position, guiding, by the object acquisition component, the user to acquire the target object.

\* \* \* \* \*